(12) United States Patent
Abrami et al.

(10) Patent No.: US 10,072,176 B2
(45) Date of Patent: Sep. 11, 2018

(54) FLEXIBLE NON-CHROMATE CORROSION INHIBITIVE PRIMER

(71) Applicant: PRC-DeSoto International, Inc., Sylmar, CA (US)

(72) Inventors: Siamanto Abrami, Glendale, CA (US); Elizabeth J. Paclibar, Granada Hills, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 47 days.

(21) Appl. No.: 15/186,321

(22) Filed: Jun. 17, 2016

(65) Prior Publication Data

US 2016/0369126 A1 Dec. 22, 2016

Related U.S. Application Data

(60) Provisional application No. 62/181,854, filed on Jun. 19, 2015.

(51) Int. Cl.

| | | |
|---|---|---|
| *C09D 163/04* | (2006.01) | |
| *C09D 175/08* | (2006.01) | |
| *C08G 59/66* | (2006.01) | |
| *C08G 65/333* | (2006.01) | |
| *C08G 65/334* | (2006.01) | |
| *C08L 63/00* | (2006.01) | |
| *C08L 75/08* | (2006.01) | |
| *C08J 7/04* | (2006.01) | |
| *C08L 71/02* | (2006.01) | |
| *C08K 3/22* | (2006.01) | |
| *C08K 3/26* | (2006.01) | |

(52) U.S. Cl.
CPC ........... *C09D 163/04* (2013.01); *C08G 59/66* (2013.01); *C08G 65/334* (2013.01); *C08G 65/33348* (2013.01); *C08J 7/04* (2013.01); *C08K 3/22* (2013.01); *C08K 3/26* (2013.01); *C08L 63/00* (2013.01); *C08L 71/02* (2013.01); *C08L 75/08* (2013.01); *C09D 175/08* (2013.01); *C08J 2363/00* (2013.01); *C08K 2003/222* (2013.01); *C08K 2003/265* (2013.01); *C08K 2201/003* (2013.01); *C08K 2201/011* (2013.01)

(58) Field of Classification Search
CPC  C08G 59/66; C08G 65/33348; C08G 65/334; C08J 2363/00; C08J 7/04; C08K 2003/222; C08K 2003/265; C08K 2201/003; C08K 2201/011; C08K 3/22; C08K 3/26; C08L 63/00; C08L 71/02; C08L 75/08; C09D 163/00; C09D 163/04; C09D 175/08; Y10T 428/31605; Y10T 428/31609; B05D 7/14; B05D 7/52
USPC ................ 428/423.1, 425.8, 425.9; 524/871; 427/207.1, 372.2, 386, 388.1, 388.2, 409
See application file for complete search history.

(56) References Cited

U.S. PATENT DOCUMENTS

| | | | |
|---|---|---|---|
| 4,742,125 A | 5/1988 | Schmidt et al. | |
| 8,231,970 B2 | 7/2012 | Walters et al. | |
| 2002/0009618 A1* | 1/2002 | Hashimoto | G11B 5/733 428/845.7 |
| 2003/0124357 A1* | 7/2003 | Kagerer | C08F 283/006 428/422.8 |
| 2009/0281253 A1* | 11/2009 | Okamoto | C08K 5/098 525/474 |
| 2012/0088862 A1* | 4/2012 | Abrami | C08G 59/182 523/435 |

FOREIGN PATENT DOCUMENTS

EP  2625232 A1  8/2013

OTHER PUBLICATIONS

Search Report and Written Opinion for International Application No. PCT/US2016/038228, dated Sep. 14, 2016, 12 pages.
Singh., "Novel Reactive Polyurethane Polymers with No Free Isocyanate Groups for Adhesive and Sealant Industries", Who's Who in France, Jan. 1991, p. 306-312.

* cited by examiner

*Primary Examiner* — Thao T Tran
(74) *Attorney, Agent, or Firm* — William R. Lambert

(57) ABSTRACT

Primer coating compositions include a thiol-terminated urethane-containing polyether prepolymer, a polyepoxide, calcium carbonate, and magnesium oxide. The coating compositions are useful as corrosion resistant primers in aerospace applications.

22 Claims, 1 Drawing Sheet

FLEXIBLE NON-CHROMATE CORROSION INHIBITIVE PRIMER

This application claims the benefit under 35 U.S.C. § 119(e) of U.S. Provisional Application No. 62/181,854 filed on Jun. 19, 2015, which is incorporated by reference in its entirety.

FIELD

The present disclosure relates to coating compositions that comprise a thiol-terminated urethane-containing polyether prepolymer, a polyepoxide, calcium carbonate and magnesium oxide. The coating compositions are useful as corrosion resistant primers in aerospace applications.

BACKGROUND

In multilayer coating systems a primer coating can be applied directly to a bare or pretreated metallic substrate to provide corrosion resistance. Chromate and other heavy metals have been used in primer coatings to improve the corrosion resistance and the adhesion of subsequently applied coatings. However, due to the hazards associated with chromate and other heavy metals, alternative non-chromate corrosion inhibitors have been developed.

For example, U.S. Pat. No. 8,231,970 describes the use of magnesium oxide such as magnesium oxide nanoparticles and other inorganic oxide nanoparticles as effective corrosion inhibitors for use in thermosetting polyamide/epoxy-functional polymer primer coatings. However, epoxy-based thermosetting primers tend to be unacceptably hard and brittle for certain applications such as aerospace coatings.

It is desirable to provide non-chromate primer coatings that exhibit the adhesion of thermosetting epoxy systems and the flexibility of polyurethane coatings.

SUMMARY

According to the present invention coating compositions comprise a thiol-terminated urethane-containing polyether prepolymer; a polyepoxide; magnesium oxide and calcium carbonate.

According to the present invention, a primer composition can comprise a thiol-terminated urethane-containing polyether prepolymer; a polyepoxide; from 5 wt % to 9 wt % calcium carbonate; and from 3 wt % to 7 wt % magnesium oxide, wherein wt % is based on the total weight of the primer composition.

According to the present invention, a cured primer coating can be prepared from the primer composition of the present disclosure.

According to the present invention, a multilayer coating comprises a cured primer coating prepared from a primer coating of the present disclosure; and a cured polyurethane coating overlying the cured primer coating.

According to the present invention, a method of coating a surface, comprising applying the primer composition of the present disclosure to a surface; curing the primer composition to provide a cured primer coating; applying a polyurethane coating over at least a portion of the cured primer coating; and curing the polyurethane coating to provide a coated surface.

According to the present invention, a primer system comprises a first part comprising: a thiol-terminated urethane-containing polyether prepolymer; and calcium carbonate; and a second part comprising: a polyepoxide; and magnesium oxide.

Reference is now made to certain compositions and methods. The disclosed compositions and methods are not intended to be limiting of the claims. To the contrary, the claims are intended to cover all alternatives, modifications, and equivalents.

BRIEF DESCRIPTION OF THE DRAWINGS

Those skilled in the art will understand that the drawings described herein are for illustration purposes only. The drawings are not intended to limit the scope of the present disclosure.

DETAILED DESCRIPTION

Figure 1A:
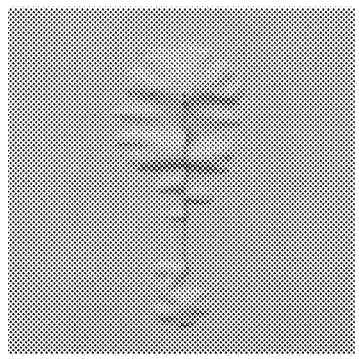
FIGS. 1A-1D show results of adhesion testing following exposure to Skydrol®.

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

"Corrosion inhibitive" refers to a composition or coating that when deposited onto a metallic substrate provides a coating that resists, prevents, or slows the alteration or degradation of the substrate such as by chemical or electro-chemical oxidizing processes. A corrosion inhibitive composition or coating can reduce anodic and/or cathodic corrosion mechanisms.

A "nanoparticle" refers to a particle characterized by an average primary particle size or mean particle diameter of less than 200 nm and/or nanoparticles having at least one dimension that is on the order of a few nanometers.

A "particle" can include nanoparticles and particles having an average primary particle size or mean particle diameter greater than 200 nm, greater than 300 nm, greater than 400 nm, or greater than 500 nm. A "particle" can have an average primary particle size, for example, from 20 nm to 600 nm, from 20 nm to 500 nm, from 20 nm to 400 nm, from 100 nm to 400 nm, or from 50 nm to 200 nm.

A "primer composition" or "primer coating" refers to a coating that can be applied to a bare or pre-treated metallic substrate surface. A primer coating can be designed to provide corrosion resistance to the metallic surface and to enhance the adhesion of an overlying coating to the metallic substrate.

Coating compositions provided by the present disclosure can be substantially free of chromium-containing material or can be completely free of such chromium-containing material. As used herein, the term "substantially free" means that a chromium-containing material is present in the composition, if at all, as an incidental impurity. In other words, the chromium-containing does not affect the properties of the composition. This means that coating compositions can contain, for example, less than 2 wt % (weight percent) of a chromium-containing material or less than 0.05 wt % of a chromium-containing material, wherein wt % is based on the total weight of the composition. As used herein, the term "completely free" means that a chromium-containing material is not present in the composition in a measurable amount. Thus, a coating composition provided by the present disclosure can contain no chromium-containing material. As used herein, the term "chromium-containing material" refers to a material that includes a chromium trioxide group, $CrO_3$. Examples of a chromium-containing material include chromic acid, chromium trioxide, chromic acid anhydride, dichromate salts, such as ammonium dichromate, sodium dichromate, potassium dichromate, calcium dichromate, barium dichromate, magnesium dichromate, zinc dichromate, cadmium dichromate, and strontium dichromate.

Compositions provided by the present disclosure can comprise a thiol-terminated urethane-containing polyether prepolymer, a polyepoxy, magnesium oxide and calcium carbonate. The magnesium oxide and/or the calcium carbonate can be in the form of particles and/or nanoparticles.

Compositions provided by the present disclosure can comprise a thiol-terminated urethane-containing polyether prepolymer. Suitable thiol-terminated urethane-containing polyether prepolymers can comprise the reaction product of a polyol, a polyisocyanate, and a compound comprising a thiol group.

Suitable polyols include polyether polyols. A polyether polyol can comprise a straight chain, branched or cyclic $C_{1-12}$ alkylene oxide, such as a polyether diol or a polyether triol. Examples of polyether polyols include polytetramethylene polyol, polymethylene oxide, polyethylene oxide, polypropylene oxide, polybutylene oxide, and combinations of any of the foregoing. A polyether polyol can include, for example, both polytetramethylene oxide segments and polypropylene oxide segments.

Suitable polyisocyanates include, for example, $C_{4-20}$ aliphatic polyisocyanates such as 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methyl-enebis(4-isocyanatocyclohexane), and 4,4-methylene dicyclohexyl diisocyanate) ($H_{12}MDI$). Examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, and combinations of any of the foregoing.

A compound comprising a thiol group can be a hydroxyl-terminated aliphatic monothiol or a dithiol. Suitable hydroxyl-terminated aliphatic monothiols include hydroxyethyl mercaptan and hydroxypropylmercaptan. Suitable dithiols include dimercaptoethane and dimercaptopropane.

Thiol-terminated polyurethane-containing polyether prepolymers can also be obtained by reacting an isocyanate-terminated urethane-containing polyether with an allyl alcohol to provide an allyl-terminated urethane-containing polyether. The allyl-terminated urethane-containing polyether can subsequently be reacted with a dithiol.

Examples of suitable allyl alcohols include allyl alcohol, 3-buten-1-ol, and 4-penten-1-ol.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane (DMDO), 1,5-dimercapto-3-oxapentane, and a combination of any of the foregoing. A polythiol may have one or more pendent groups such as a lower (e.g., $C_{1-6}$) alkyl group, a lower alkoxy group, and a hydroxyl group. Suitable alkyl pendent groups include, for example, $C_{1-6}$ linear alkyl, $C_{3-6}$ branched alkyl, cyclopentyl, and cyclohexyl.

A thiol-terminated urethane-containing polyether prepolymer can be prepared by reacting a polythioether polyol with an isocyanate in a ratio to provide an isocyanate-terminated urethane-containing polyether prepolymer. The reaction can be catalyzed by a suitable catalyst such as dibutyl tin dilaurate, dibutyl tin oxide, dibutyl tin di-2-hexoate, stannous oleate, stannous octoate, lead octane, ferrous acetoacetate, and amines such as triethylamine, diethylmethylamine, triethylenediamine, dimethyl-ethylamine, morpholine, N-ethyl morpholine, piperazine, N,N-dimethyl benzylamine, N,N-dimethyl laurylamine, and combinations of any of the foregoing.

An isocyanate-terminated urethane-containing polyether prepolymer can be capped with a thiol group by reacting the isocyanate-terminated urethane-containing polyether prepolymer with a compound comprising a thiol group and a group reactive with an isocyanate group. The isocyanate-terminated urethane-containing polyether prepolymer and thiol compound can be reacted in a molar ratio such as to provide a thiol-terminated urethane-containing polyether prepolymer.

Thiol-terminated urethane-containing polyether prepolymers can be characterized by an number average molecular weight (Mn), for example, from 7,000 Daltons to 10,000 Daltons, or from 7,500 Daltons to 9,000 Daltons; a sulfur content, for example, from 1% to 4%, such as from 2.5% to 3%; a viscosity at 25° C., for example, from 1,000 poise to 3,000 poise such as from 1000 poise to 2,000 poise; and a functionality from 2 to 4, from 3 to 4, or from 3.5 to 4. The number average molecular weight and molecular weight distribution of polythioether prepolymers may be characterized by end group analysis using iodine titration. Viscosity can be determined using a Brookfield CAP 2000 viscometer, spindle #6, at 25° C., and 300 rpm.

Suitable thiol-terminated urethane-containing polyether prepolymers include Permapol® P2-805, Permapol® P2-850, Permapol® P2-935, and Permapol® P2-985, each of which is commercially available from PPG Aerospace.

Permapol® P2-850 comprises a thiol-terminated urethane-containing polyether prepolymer. The prepolymer can be prepared by reacting a polyol with a diisocyanate to form an isocyanate-terminated urethane-containing polyether prepolymer. The urethane-containing polyether prepolymer can then be reacted with an allyl alcohol to provide an alkenyl-terminated prepolymer. The alkenyl-terminated urethane-containing polyether prepolymer can then reacted with dimercaptodioxaoctane (DMDO) to provide a thiol-terminated urethane-containing polyether prepolymer.

Sprayable primer coating compositions provided by the present disclosure can comprise a curing agent such as a polyepoxide.

Curing agents useful in compositions provided by the present disclosure can include a polyepoxide such as a diepoxide that is reactive with the thiol terminal groups of the thiol-terminated urethane-containing polyether prepolymer.

A curing agent can comprise a polyepoxy curing agent such as a polyepoxide, e.g., a compound having two or more reactive epoxy groups. Examples of suitable polyepoxides include polyepoxide resins such as hydantoin diepoxide, diglycidyl ether of bisphenol-A, diglycidyl ether of bisphenol-F, Novolac® type epoxies such as DEN™ 438 (available from Dow), certain epoxidized unsaturated resins, and combinations of any of the foregoing.

A polyepoxide can comprise a polyepoxy resin, which is a low molecular prepolymer or higher molecular weight prepolymer containing at least two epoxy groups. Examples of suitable polyepoxide resins include Bisphenol A epoxide resins, Bisphenol F epoxide resins, Bisphenol S epoxide resins, Novolac epoxide resins, aliphatic epoxide resins including glycidyl epoxide resins and cycloaliphatic epoxides, glycidylamine epoxide resins, and combinations of any of the foregoing.

A polyepoxide can comprise a polyepoxide resin such as DEN® 438 Novolac epoxy resin, having multi-epoxy functionality (±3.6) and a viscosity from 31,000 Mpa-S to 40,000 Mpa-S (ASTM D-445, 51.7° C.).

Compositions provided by the present disclosure comprise a corrosion inhibitor. A corrosion inhibitor is a chemical compound or compounds, which when added to an environment such as a coating overlying a metallic surface reduces the corrosion rate of the metallic surface. Cathodic corrosion inhibitors can reduce the corrosion rate by retarding cathodic reactions. A cathodic inhibitor can cause formation of insoluble compounds precipitating on cathodic corrosion sites in the form of a barrier film. Reducing the effective cathode area can result in a decreased corrosion rate. Anodic inhibitors can reduce the corrosion rate by retarding anodic reactions. An anodic inhibitor can shift the equilibrium of the corrosion process to the passivation zone causing formation of a thin passivation oxide film on anodic corrosion sites, which increases the anode potential and depresses the oxidation process. Reducing the effective anode area can result in a decreased corrosion rate. Examples of anodic inhibitors include oxides such as magnesium oxide.

Compositions provided by the present disclosure can comprise a non-chromate corrosion inhibitor comprising magnesium oxide. The magnesium oxide can comprise magnesium oxide particles, magnesium oxide nanoparticles, or a combination thereof. The use of a combination of calcium carbonate and magnesium oxide results in a synergistic improvement in the corrosion resistance compared to the use of magnesium oxide alone or with the use of magnesium oxide and a lesser amount of calcium carbonate. Increasing the amount of calcium carbonate in a primer composition comprising magnesium oxide can improve the solvent resistance such as the Skydrol® LD40 resistance of a primer coating, The Skydrol® LD40 resistance of a composition can be improved by replacing some or all of the inorganic filler in the composition with calcium carbonate. For example, calcium carbonate can replace some or all of the carbon black. Replacing as little as, for example, 0.2 gm, 0.3 gm, 0.4 gm, 0.5 gm, 0.6 gm, or 0.7 gm of carbon black with the same amount of calcium carbonate can significantly improve the Skydrol resistance of a primer coating without substantially affecting other properties of the cured coating Note that 1.3 gm represents about 1 wt % of the total weight of the sprayable primer composition, or about 3 wt % of the total solids weight of the sprayable composition.

Suitable magnesium oxide particles and nanoparticles are disclosed in U.S. Pat. No. 8,231,970, which is incorporated by reference in its entirety. Magnesium oxide particles and nanoparticles can be prepared as disclosed in U.S. Pat. No. 8,231,970.

Suitable magnesium oxide nanoparticles can be characterized as having a calculated equivalent spherical diameter less than 200 nanometers, less than 100 nanometers, or less than 50 nanometers; such as from 1 nanometer to 100 nanometers, from 1 nanometers to 50 nanometers, or from 5 nanometers to 50 nanometers. Magnesium oxide nanoparticles having a calculated equivalent spherical diameter less than 200 nanometers can be referred to as magnesium oxide nanoparticles. A calculated equivalent spherical diameter can be determined from the BET specific surface area according to the following equation:

$$\text{Diameter (nm)} = 6{,}000/[\text{BET (m}^2/\text{g}) \times \rho(\text{g/cm}^3)].$$

Magnesium oxide nanoparticles can have an average primary particle size less than 100 nm, less than 50, or less than 20 nm, such as from 1 nm to 100 nm, from 1 nm to 50 nm, or from 1 nm to 20 nm, as determined by transmission electron microscopy.

Primary particle size of a particle refers to the smallest diameter sphere that will completely enclose the particle. As used herein, the term "primary particle size" refers to the size of an individual particle (i.e., a primary particle) as opposed to an agglomeration of two or more individual nanoparticles.

Magnesium oxide nanoparticles used in primer compositions can have an average diameter, for example, from 10 nm to 200 nm, from 10 nm to 100 nm, from 10 nm to 50 nm, from 20 nm to 100 nm, from 40 nm to 100 nm, from 40 nm to 60 nm, from 15 nm to 25 nm, or from 10 nm to 20 nm.

Suitable magnesium oxide nanoparticles for use in sprayable primer compositions provided by the present disclosure are available, for example, from US Research Nanomaterials, Inc., American Elements, Azo Nano, and EPRUI Nanoparticles & Microspheres Co. Ltd.

In addition to magnesium oxide, primer compositions provided by the present disclosure can comprise calcium carbonate. The calcium carbonate can be in the form of particles, nanoparticles, or a combination thereof.

Calcium carbonate particles can be characterized by a mean particle diameter, for example, from 1 nm to 500 nm, from 1 nm to 400 nm, from 1 nm to 300 nm, from 1 nm to 200 nm, from 20 nm to 170 nm, from 30 nm to 150 nm, or from 50 nm to 150 nm.

Calcium carbonate particles can be uncoated or fatty acid-coated calcium carbonate nanoparticles characterized by a calcite rhombohedral structure, a mean particle diameter from 40 nm to 130 nm, a specific surface area from 16 $m^2/g$ to 24 $m^2/g$, a Bingham yield value of 90 Pa to 250 Pa, and a viscosity of 1.8 Pa-s.

Suitable calcium carbonate nanoparticles are available, for example, from Solvay Chemicals and include grades such as Socal® 311, Socal® 312, Socal® 322, Socal® U1S1, and Socal® U1S2, Winnofil® S, Winnofil® SPM, and Winnofil® SPT.

A primer composition may comprise from 5 wt % to 10 wt %, from 5.5 wt % to 9 wt %, from 6 wt % to 8 wt %, or from 6.5 wt % to 8 wt % of calcium carbonate nanoparticles such as calcium carbonate nanoparticles, wherein wt % is based on the total weight of the primer composition. A primer composition may comprise, for example, greater than 6.5 wt %, greater than 7 wt %, greater than 7.2 wt %, greater than 7.5 wt % or greater than 8 wt % calcium carbonate such as calcium carbonate nanoparticles, where wt % is based on the total weight of the primer composition.

A primer composition may comprise from 3 wt % to a 8 wt %, from 4 wt % to 7 wt %, from 4.5 wt % to 6.5 wt %, or from 5 wt % to 6 wt % of magnesium oxide such as magnesium oxide nanoparticles, wherein wt % is based on the total weight of the primer composition.

A primer composition can comprise a ratio (wt %/wt %) of calcium carbonate to magnesium oxide such as calcium carbonate nanoparticles to magnesium oxide nanoparticles, for example, from 1.1 to 2.0, from 1.2 to 1.8, or from 1.2 to 1.6, where wt % is based on the total weight of the sprayable primer composition. A primer composition can comprise a ratio (wt %/wt %) of calcium carbonate to magnesium oxide such as calcium carbonate nanoparticles to magnesium oxide nanoparticles, for example, greater than 1.2, greater than 1.3, greater than 1.4, greater than 1.5, greater than 1.6, or greater than 1.7 where wt % is based on the total weight of the sprayable primer composition.

A sprayable primer composition can have a solids content from 20 wt % to 50 wt %, from 25 wt % to 45 wt %, or from 30 wt % to 40 wt %, where wt % is based on the total weight of the sprayable primer composition. A sprayable primer composition can have a solvent content from 50 wt % to 80 wt %, from 55 wt % to 75 wt %, or from 60 wt % to 70 wt %, where wt % is based on the total weight of the sprayable primer composition.

A sprayable primer composition can comprise from 15 wt % to 30 wt %, from 17 wt % to 28 wt %, from 19 wt % to 26 wt %, or from 19 wt % to 24 wt % calcium carbonate such as calcium carbonate nanoparticles, where wt % is based on the total solids weight of the sprayable composition.

A sprayable primer composition can comprise greater than 17 wt %, greater than 19 wt %, greater than 21 wt %, greater than 23 wt %, or greater than 25 wt % calcium carbonate such as calcium carbonate nanoparticles, where wt % is based on the total solids weight of the sprayable composition.

A sprayable primer composition can comprise from 12 wt % to 20 wt %, from 13 wt % to 19 wt %, from 14 wt % to 18 wt %, or from 15 wt % to 17 wt % magnesium oxide such as magnesium oxide nanoparticles, where wt % is based on the total solids weight of the sprayable composition.

A sprayable primer composition can comprise a ratio (wt %/wt %) of calcium carbonate to magnesium oxide such as calcium carbonate nanoparticles to magnesium oxide nanoparticles, for example, from 1.1 to 2.0, from 1.2 to 1.8, or from 1.2 to 1.6, where wt % is based on the total solids weight of the sprayable composition. A sprayable primer composition can comprise a ratio (wt %/wt %) of calcium carbonate to magnesium oxide such as calcium carbonate nanoparticles to magnesium oxide nanoparticles, for example, greater than 1.2, greater than 1.3, greater than 1.4, greater than 1.5, greater than 1.6, or greater than 1.7, where wt % is based on the total solids weight of the sprayable composition.

A sprayable primer composition comprise from 8 wt % to 17 wt %, from 9 wt % to 16 wt %, from 10 wt % to 15 wt %, from 11 wt % to 14 wt %, or from 12 wt % to 23 wt % of calcium carbonate and magnesium oxide such as calcium carbonate nanoparticles and magnesium oxide nanoparticles combined, where wt % is based on the total weight of the sprayable primer composition.

A sprayable primer composition comprise from 30 wt % to 44 wt %, from 32 wt % to 42 wt %, from 34 wt % to 40 wt %, or from 36 wt % to 38 wt % of calcium carbonate and magnesium oxide combined such as calcium carbonate nanoparticles and magnesium oxide nanoparticles combined, where wt % is based on the total solids weight of the sprayable primer composition.

Compositions provided by the present disclosure may be formulated as sprayable primers. Sprayable primer compositions can be provided as a three-component system including a base component, an activator component, and a thinner component. The base component can comprise a thiol-terminated urethane-containing polyether prepolymer and calcium carbonate such as calcium carbonate nanoparticles. The activator component can comprise a polyepoxide and magnesium oxide such as magnesium oxide nanoparticles. The thinner component can comprise a solvent.

Primer compositions can comprise, for example, from 6 wt % to 14 wt %, from 8 wt % to 12 wt %, or from 9 wt % to 11 wt %, of a thiol-terminated urethane-containing polyether prepolymer, where wt % is based on the total weight of the sprayable primer composition. Primer compositions can comprise, for example, from 20 wt % to 40 wt %, from 25 wt % to 35 wt %, or from 27 wt % to 33 wt %, of a thiol-terminated urethane-containing polyether prepolymer, where wt % is based on the total solids weight of the sprayable primer composition. The total weight of the sprayable primer composition includes the weight of the base component, the weight of the activator component, and the weight of the thinner component; or the total weight of the sprayable primer composition as applied to a substrate.

Primer compositions can comprise from 1 wt % to 6 wt %, from 2 wt % to 5 wt %, from 2.5 wt % to 4.5 wt %, or from 3 wt % to 4 wt % of a polyepoxide, where wt % is based on the total weight of the sprayable primer composition. Primer compositions can comprise from 6 wt % to 14 wt %, from 7 wt % to 13 wt %, from 8 wt % to 12 wt %, or from 9 wt % to 10 wt % of a polyepoxide, where wt % is based on the total solids weight of the sprayable primer composition.

Primer compositions can comprise from 0.5 wt % to 2 wt %, from 0.5 wt % to 1.5 wt %, from 0.75 wt % to 1.25 wt %, or from 0.9 wt % to 1.1 wt %, carbon black, where wt % is based on the total weight of the sprayable primer composition. Primer compositions can comprise from 1 wt % to 5 wt %, from 2 wt % to 4 wt %, from 2.5 wt % to 3.5 wt %, or from 2.75 wt % to 3.25 wt % carbon black, where wt % is based on the total solids weight of the sprayable primer composition.

Primer compositions can comprise, for example, from 50 wt % to 70 wt %, from 55 wt % to 65 wt %, or from 55 wt % to 61 wt % of combined solvents, where wt % is based on the total weight of the sprayable primer composition. The combined solvents include solvents in the base component, the activator component, and the thinner component of the sprayable composition.

A primer coating composition can comprise a stoichiometric equivalent or a substantially stoichiometric equivalent of reactive thiol groups and reactive epoxy groups.

In addition to a prepolymer, a polyepoxide, and a non-chromate corrosion inhibitor, a primer composition can comprise, for example, flow control agents, thixotropic agents, adhesion promoters, catalysts, fillers, solvents, and pigments.

Primer coating compositions can be formulated as one-component compositions where a curing agent (or activator) is admixed with other components of the coating composition to form a storage-stable composition. Alternatively, primer coating compositions provided by the present disclosure can be formulated as a two-component coating composition where a curing agent (or activator) is included in an activator component that is added to an admixture or base containing other components just prior to application. The calcium carbonate and magnesium oxide may be present in either or both of the activator component or the base component of the two-component composition. Primer coating compositions can also be formulated as a three-component coating composition comprising, for example, a base component, an activator component, and a thinner component, where the three components are mixed prior to application. The corrosion inhibitor can be present in at least one of the base component, the activator component, or the thinner component of the three-component system. Additionally, the calcium carbonate and magnesium oxide may be present in at least two of the base component, the activator component, or the thinner component of the three-component system. Further, the corrosion inhibitor may be present in each of the base component, the activator component, and the thinner component of the three-component system. The calcium carbonate and the magnesium oxide can be included together or separately in one or the other of the base, activator, and thinner components.

Primer coating compositions provided by the present disclosure may be in the form of a liquid coating composition, such as a waterborne coating composition, a solvent-borne coating composition, or an electrodepositable coating composition. The coating compositions may also be in the form of a co-reactive solid in particulate form (i.e., a powder coating composition). The coating compositions may be prepared by any of a variety of suitable methods. For example, calcium carbonate and magnesium oxide can be added at any time during the preparation of a coating composition, provided the nanoparticles form a stable dispersion. A coating composition can be prepared by first blending the prepolymer, the calcium carbonate and magnesium oxide, and a diluent, such as an organic solvent and/or water. When water is used as a diluent, the coating composition may be a waterborne coating composition. A waterborne coating composition may include a film-forming resin formed from the reaction of the thiol-terminated urethane-containing polyether prepolymer and the polyepoxide. The calcium carbonate and magnesium oxide may be present in any or all of the components of the waterborne coating composition.

When organic solvent is used as a diluent, the primer coating composition may be a solvent-borne coating composition. Solvent-borne coating compositions may include a film-forming resin formed from the reaction of a thiol-terminated urethane-containing polyether prepolymer and a polyepoxide. For example, a solvent-borne coating composition may be a three component system including a base component, e.g., containing the prepolymer, an activator component, e.g., containing the polyepoxide, and optionally a thinner component, e.g., solvents mixture. Any of the base component, activator component, or thinner component can include other components, such as pigments, fillers, and/or other additives. In use, when ready to apply the coating composition to a substrate, the base component and the activator component, and if appropriate the thinner component, can be mixed together, applied to the substrate and allowed to cure. The calcium carbonate and magnesium oxide may be present in any or all of the components of the solvent-borne coating composition.

A sprayable composition can comprise a solvent or a combination of solvents. Examples of suitable solvents include isopropyl alcohol, 1-methoxy-2-propanol acetate, parachlorobenzotrifluoride, methyl n-amyl ketone, n-butyl acetate, and combinations of any of the foregoing.

A sprayable composition can comprise a thinner such as CA 1800CX available from PPG Aerospace.

A sprayable composition can comprise an adhesion promotor or combination of adhesion promoter. Examples of suitable adhesion promoters include allyl ethers of methylol phenol and xylene formaldehyde polymer with epoxy such as the Methylon® 75108 and Methylon® 75202 and other adhesion promoters available from Durez Corporation.

A sprayable composition can comprise a catalyst such as an amine catalyst. An example of a suitable amine catalyst is DABCO® 33-LV from Air Products, triethylenediamine in dipropylene glycol. An amine catalyst can comprise a tertiary amine catalyst such as 2,4,6-tri(dimethyl aminomethyl)phenol, such as Anacamine® K54 from Air Products. A catalyst can comprise a combination of amine catalyst such as a combination of DABCO® 33-LV and Anacamine® K54.

A sprayable composition can comprise an inorganic material or combination of inorganic materials. An inorganic material can include, for example, carbon black, calcium carbonate, titanium dioxide, magnesium oxide, or a combination of any of the foregoing. An example of a suitable carbon black includes Thermax® Powder UltraPure N-991 from Cancarb Limited. Other carbon blacks can be used. An example of as suitable titanium dioxide pigment includes Ti-Pure® R706 available from DuPont. Other titanium dioxide pigments can be used.

Thus, primer compositions can comprise a first part comprising a thiol-terminated urethane-containing polyether prepolymer; and calcium carbonate such as calcium carbonate nanoparticles; and a second part comprising a polyepoxide; and magnesium oxide such as magnesium oxide nanoparticles.

A primer system can comprise a first part comprising from 18 wt % to 30 wt % of the thiol-terminated urethane-containing polyether prepolymer; and from 11 wt % to 23 wt % of the calcium carbonate such as calcium carbonate nanoparticles; wherein wt % is based on the total weight of the first part; and the second part comprises: from 9 wt % to 17 wt % of the polyepoxide; and from 16 wt % to 28 wt % of the magnesium oxide such as magnesium oxide nanoparticles, wherein wt % is based on the total weight of the second part.

A primer system can comprise a first part comprising from 20 wt % to 28 wt % of the thiol-terminated urethane-containing polyether prepolymer; and from 13 wt % to 21 wt % of the calcium carbonate such as calcium carbonate nanoparticles; wherein wt % is based on the total weight of the first part; and the second part comprises: from 11 wt % to 15 wt % of the polyepoxide; and from 18 wt % to 26 wt % of the magnesium oxide such as magnesium oxide nanoparticles, wherein wt % is based on the total weight of the second part.

A primer system can comprise a first part comprising from 22 wt % to 26 wt % of the thiol-terminated urethane-containing polyether prepolymer; and from 15 wt % to 19 wt % of the calcium carbonate such as calcium carbonate nanoparticles; wherein wt % is based on the total weight of the first part; and the second part comprises: from 12 wt % to 14 wt % of the polyepoxide; and from 20 wt % to 24 wt % of the magnesium oxide such as magnesium oxide nanoparticles, wherein wt % is based on the total weight of the second part.

A primer system can further comprise a third part, wherein the third part comprises a solvent.

A sprayable primer system can comprise from 30 wt % to 42 wt % of the first part; from 24 wt % to 30 wt % of the second part; and from 30 wt % to 42 wt % of the third part, wherein wt % is based on the total weight of the primer system.

A sprayable primer system can comprise from 32 wt % to 40 wt % of the first part; from 26 wt % to 28 wt % of the second part; and from 32 wt % to 40 wt % of the third part, wherein wt % is based on the total weight of the primer system.

A sprayable primer system can comprise from 34 wt % to 38 wt % of the first part; from 26 wt % to 28 wt % of the second part; and from 34 wt % to 38 wt % of the third part, wherein wt % is based on the total weight of the primer system.

The first part (base), second part (activator), and third part (thinner) can be combined in a wt % ratio of 4:3:4 to provide a sprayable primer composition.

Compositions provided by the present disclosure can be used as corrosion resistant primer coatings. The term "primer coating composition" refers to coating compositions from which an undercoating may be deposited onto a substrate in order to prepare the surface for application of a coating system. Metal substrates that may be coated with such compositions include, for example, substrates comprising steel (including electro-galvanized steel, cold rolled steel, hot-dipped galvanized steel, among others), aluminum, aluminum alloys, zinc-aluminum alloys, and aluminum plated steel. Substrates that may be coated with a primer coating composition also may comprise more than one metal or metal alloy, in that the substrate may be a combination of two or more metal substrates assembled together, such as hot-dipped galvanized steel assembled with aluminum substrates.

The primer coating compositions of the present invention may be applied to bare metal. By "bare" is meant a metal surface that has not been treated with any pretreatment compositions, such as, for example, conventional phosphating baths, heavy metal rinses, chemical conversion coating, or chromate anodizing. Bare metal may be sand blasted or abraded by mechanical force to improve adhesion to the primer coating. Additionally, bare metal substrates being coated with the primer coating compositions of the present invention may be a cut edge of a substrate that is otherwise treated and/or coated over the rest of its surface.

Primer coating compositions provided by the present disclosure may be applied to treated metal surface. By "treated" is meant a metal surface that has been treated with pretreatment compositions, such as, for example, a phosphating bath, heavy metal rinse, chemical conversion coating, chromate anodizing, or a non-chromate surface treatment. Additionally, treated metal substrates being coated with primer coating compositions provided by the present disclosure may be a cut edge of a substrate that is otherwise treated and/or coated over the rest of its surface.

Before applying a primer coating composition, a metal substrate to be coated may first be cleaned to remove grease, dirt, and/or other contaminants. Conventional cleaning procedures and materials may be employed. Cleaning procedures can include, for example, the use mild or strong alkaline cleaner. Examples of substrate cleaning solutions include ALK-660 and ED-500, available from PPG Aerospace. The application of such cleaners may be followed and/or preceded by a water rinse.

After cleaning with an alkaline cleaner, a metal surface may then be rinsed with an aqueous acidic solution and before depositing a metal substrate primer coating composition. Examples of suitable rinse solutions include mild or strong acidic cleaners, such as dilute phosphoric acid solutions. Examples of suitable aqueous acidic solutions include, for example, AC-5 and AC-12, available from PPG Aerospace.

Primer coatings prepared or deposited from primer coating compositions provided by the present disclosure can be top-coated or overcoated with an overlying protective and/or decorative coating system, such as a monolayer topcoat or a combination of a pigmented base coating composition and a clearcoat composition, i.e., a color-plus-clear system. As a result, the present invention is also directed to multi-component composite coatings comprising at least one coating layer deposited from a corrosion inhibitive primer coating composition provided by the present disclosure. A multi-component or multilayer composite coating can comprise a base-coat film-forming composition serving as a basecoat, which can be a pigmented color coat, and a film-forming composition applied over the basecoat serving as a topcoat, which can be a transparent or clear coat.

A coating composition from which the basecoat and/or topcoat is deposited may comprise, for example, a suitable basecoat or topcoat coating compositions known to those skilled in the art of, for example, formulating automotive OEM coating compositions, automotive refinish coating compositions, industrial coating compositions, architectural coating compositions, coil coating compositions, and aerospace coating compositions, among others. An overcoat composition can comprise a urethane-based coating composition such as, for example, any of the CA 8200, Desothane® HS topcoats available from PPG Aerospace.

Primer coating compositions provided by the present disclosure may be prepared by any of a variety of suitable methods. For example, the corrosion inhibiting nanoparticles can be added at any time during the formulation of a coating composition comprising a film-forming resin, provided that the corrosion inhibiting nanoparticles form a stable dispersion in a film-forming resin. Coating compositions can be prepared by first mixing a composition comprising the prepolymer, the calcium carbonate and magnesium oxide, pigments, fillers and diluents, such as organic solvents and/or water, dispersing the mixture with a high speed disperser, for example, at 1000 RPM to 2000 RPM for 10 minutes to 30 minutes, and then passing the dispersion through a paint mill to achieve grinding fineness of 5 plus as determined using a grinding gauge.

A primer coating composition may be applied to a substrate using suitable application techniques, such as dipping or immersion, spraying, intermittent spraying, dipping followed by spraying, spraying followed by dipping, brushing, or by roll-coating. Suitable spray techniques and equipment for air spraying and electrostatic spraying, either by manual or automatic methods, can be used. Although the primer coating compositions provided by the present disclosure can be applied to various substrates, such as wood, glass, cloth, plastic, foam, including elastomeric substrates and the like, in many cases, the substrate comprises a metal.

After a primer coating composition is applied to a substrate, a film is formed on the surface of the substrate by driving solvent, i.e., organic solvent and/or water, out of the film by heating or by an air-drying period. Suitable drying conditions can depend on the particular composition and/or application, and can include, for example, a drying time of from 1 minute to 5 minutes at a temperature of 80° F. to 250° F. (27° C. to 121° C.). More than one coating layer may be applied over the primer coating. Between coats, the previously applied coat can be flashed; for example, exposed to ambient conditions for 5 minutes to 30 minutes.

The thickness of an applied primer coating can be, for example, from 0.1 mils to 3 mils (2.5 microns to 75 microns), such as from 0.2 mils to 2 mils (5 microns to 50 microns). A primer coating composition may then be heated to cure the coating. During the curing operation, solvents are driven off and crosslinkable components of the composition, if any, are crosslinked. The heating and curing operation can be carried out, for example, at a temperature in from 80° F. to 250° F. (27° C. to 121° C.) or lower or higher temperatures may be used.

After application of a primer coating composition to the substrate and curing, a topcoat can be applied over the cured primer coating in case of multi-layer coating system. Between coats, a previously applied coating can be flashed; for example, exposed to ambient conditions for 1 hour to 72 hours, such as from 2 hours to 24 hours. The thickness of a topcoat can be, for example, from 0.5 mils to 4 mils (12 microns to 100 microns), such as 1 mil to 3 mils (25 microns to 75 microns). The topcoat can comprise a polyurethane prepolymer. The multilayer coating can then be heated. In the curing operation, solvents can be driven off and crosslinkable components of the overlying coating composition, if any, can be crosslinked. The heating and curing operation can be carried out at a temperature from 80° F. to 250° F. (27° C. to 121° C.) or lower or higher temperatures may be used.

Methods of coating a surface comprise applying a primer composition provided by the present disclosure to a surface; curing the primer composition to provide a cured primer coating; applying a polyurethane coating over at least a portion of the cured primer coating; and curing the polyurethane coating to provide a coated surface.

Primer coatings and multilayer coatings provided by the present disclosure can pass the requirements of specification MIL-PRF-32239A.

EXAMPLES

Embodiments provided by the present disclosure are further illustrated by reference to the following examples, which describe corrosion inhibitive primer coating compositions and properties of corrosion inhibitive primer coating compositions. It will be apparent to those skilled in the art that many modifications, both to materials, and methods, may be practiced without departing from the scope of the disclosure.

Example 1

Primer Coating and Polyurethane Topcoat

A sprayable primer composition was prepared by mixing a base, an activator, and a thinner.

To prepare the base composition the components in the amounts listed in Table 1 were combined and thoroughly mixed.

TABLE 1

| Base composition. | |
| --- | --- |
| Component | Wt (g) |
| Prepolymer (Permapol ® P2-850; PPG Aerospace) | 9.5 |
| Amine catalysts | 0.2 |
| Adhesion promotor | 0.2 |
| Calcium carbonate nanoparticles (Winnofil ® SPM; Solvay) | 6.7 |
| Solvents | 17.3 |
| Rutile titanium dioxide pigment (Ti-Pure ® R706; DuPont) | 5.9 |
| Total | 39.9 |

To prepare the activator composition the components in the amounts listed in Table 2 were combined and thoroughly mixed.

TABLE 2

| Activator composition. | |
| --- | --- |
| Component | Wt (g) |
| Solvents | 17.8 |
| Polyepoxide resin (DEN ® 438 Epoxy Novolac; Dow Chemical) | 4.0 |
| Carbon black (Thermax ® Powder UltraPure N-991; Cancarb Limited) | 1.3 |
| Magnesium oxide | 6.6 |
| Total | 29.7 |

The components of a thinner composition are listed in Table 3.

TABLE 3

| Thinner composition. | | | |
| --- | --- | --- | --- |
| Component | Material | Manufacturer | Wt (g) |
| Solvent | CA 1800CX | PPG Aerospace | 30.4 |

The sprayable primer was prepared by mixing 4 parts by weight of the base composition, 3 parts by weight of the activator composition, and 4 parts by weight of the thinner.

The sprayable primer had a VOC of 350 g/L, and a working time (pot life) of about 2 hours.

The test samples were prepared by spray application over MIL-C-5541 and MIL-A-8625 Type I treated panels.

Test samples were prepared by spaying the sprayable primer composition onto aluminum 2024-T3, aluminum 6061-T6, or aluminum 6061-T0, substrates treated with Alodine® 600, Alodine® 1200, CAA (chromic acid anodized), or EAP-9 (Boegel non-chromated conversion coating).

After the primer coating was cured by exposing the coating to a temperature of 77° F. (25° C.) for 4 hours, a CA 8211 polyurethane topcoat was applied over the cured primer coating. The topcoat was 2±0.3 mils thick. CA 8211 is commercially available from PPG Aerospace.

The panels were tested according to ASTM D1200, ASTM D3363, ASTM D3359, ASTM 2794 Federal Test Standard Method 141 6301.1, and Federal Test Standard Method 141 6226.

The results are presented in Table 4.

TABLE 4

Multilayer coating results.

| Test | Substrate | Result |
| --- | --- | --- |
| VOC | — | 300 g/L |
| Working Time (pot life) | — | 2 hours |
| Dry Adhesion | T6 Bare Alodine ® 600 | Pass |
| | T6 Bare Alodine ® 1200 | Pass |
| | T3 Bare Alodine ® 1200 | Pass |
| | T3 Bare CAA | Pass |
| | T3 Clad EAP-9 | Pass |
| Wet Adhesion | T6 Bare Alodine ® 600 | Pass |
| 7 days water at 77° F. | T6 Bare Alodine ® 1200 | Pass |
| | T3 Bare Alodine ® 1200 | Pass |
| | T3 Bare CAA | Pass |
| | T3 Clad EAP-9 | Pass |
| GE Impact -flexibility | T0 Bare CAA | 60% elongation (primer only) |
| Flexibility, 1-inch mandrel | T3 Bare CAA | Pass |

Example 2

Effect of Calcium Carbonate Content on Skydrol® Resistance

The effect of increased calcium carbonate on the Skydrol® resistance was determined.

Two sprayable formulation were prepared as in Example 1. The formulations had the amounts of magnesium oxide, calcium carbonate, and carbon black, as shown in Table 5.

| Sample | Magnesium Oxide MgO (g in base) | Calcium Carbonate CaCO$_3$ (g in activator) | Carbon Black (g in activator) |
| --- | --- | --- | --- |
| A | 6.6 | 6.7 | 1.3 |
| B | 6.7 | 7.3 | 0.51 |

Figure 1B:
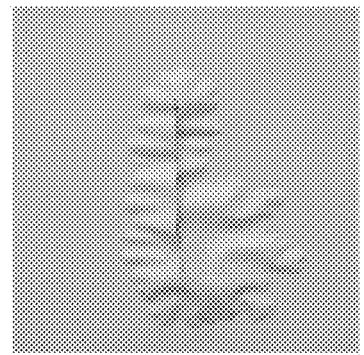
Figure 1C:
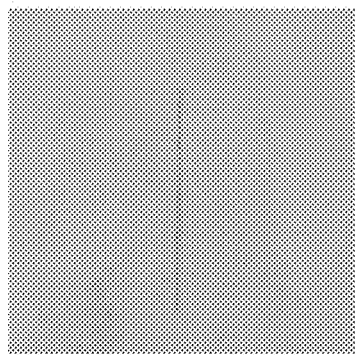
Figure 1D:
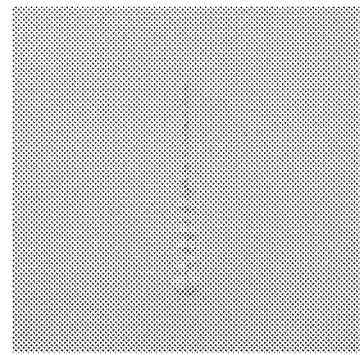

The sprayable sealant formulations were applied to a T3 Alodine® 1200 surface and cured according to the methods disclosed in Example 1. The test panels were exposed to Skyrol® LD40 and the adhesion tested according to ASTM D3359. The results are presented in FIGS. 1A-1D. FIGS. 1A and 1B show photographs of the panels coated with Formulation A following immersion in Skyrol® for 4 hours, and from 24 hours, respectively. The topcoat swelled and delaminated following exposure to Skydrol®. FIGS. 1C and 1D show photographs of panels coated with Formulation B following immersion in Skyrol® for 4 hours, and for 24 hours, respectively. Increasing the content of calcium carbonate in primer improved the Skydrol® resistance of the topcoat.

Aspects of the present invention include:

Aspect 1. A primer composition comprising a thiol-terminated urethane-containing polyether prepolymer; a polyepoxide; from 5 wt % to 9 wt % calcium carbonate; and from 3 wt % to 7 wt % magnesium oxide, wherein wt % is based on the total weight of the primer composition.

Aspect 2. The primer composition of Aspect 1, wherein the ratio (wt %/wt %) of calcium carbonate to magnesium oxide is greater than 1.3.

Aspect 3. The primer composition of Aspects 1-2, wherein the primer composition comprises: from 16 wt % to 26 wt % of the calcium carbonate; and from 12 wt % to 20 wt % of the magnesium oxide, wherein wt % is based on the total solids weight of the composition.

Aspect 4. The primer composition of Aspects 1-3, wherein the polyepoxide comprises a novolac epoxy resin.

Aspect 5. The primer composition of Aspects 1-4, wherein, the calcium carbonate comprises calcium carbonate nanoparticles characterized by a mean particle diameter from 20 nm to 200 nm; and the magnesium oxide nanoparticles are characterized by a mean particle diameter from 10 nm to 100 nm.

Aspect 6. The primer composition of Aspects 1-5, wherein the primer composition comprises: from 8 wt % to 12 wt % of the thiol-terminated urethane-containing polyether prepolymer; and from 1 wt % to 5 wt % of the polyepoxide; and wherein wt % is based on the total weight of the primer composition.

Aspect 7. The primer composition of Aspects 1-6, wherein the primer composition comprises: from 20 wt % to 40 wt % of the thiol-terminated urethane-containing polyether prepolymer; and from 7 wt % to 13 wt % of the polyepoxide; wherein wt % is based on the total solids weight of the primer composition.

Aspect 8. The primer composition of Aspects 1-7, wherein the primer composition comprises from 55 wt % to 65 wt % of a solvent or combination of solvents, wherein wt % is based on the total weight of the primer composition.

Aspect 9. The primer composition of Aspects 1-8, wherein the primer composition comprises from 28 wt % to 40 wt % solids, wherein wt % is based on the total weight of the primer composition.

Aspect 10. A cured primer coating prepared from the primer composition of Aspects 1-9.

Aspect 11. A substrate comprising the cured primer coating of Aspect 10.

Aspect 12. The substrate of Aspect 11, wherein the substrate comprises aluminum or an aluminum alloy.

Aspect 13. A multilayer coating, comprising, a cured primer coating prepared from the primer composition of Aspects 1-9; and a cured polyurethane coating overlying the cured primer coating.

Aspect 14. A method of coating a surface, comprising: applying the primer composition of Aspects 1-9 to a surface; curing the primer composition to provide a cured primer coating; applying a polyurethane coating over at least a portion of the cured primer coating; and curing the polyurethane coating to provide a coated surface.

Aspect 14. A primer system, comprising: a first part comprising: a thiol-terminated urethane-containing polyether prepolymer; and calcium carbonate; and a second part comprising: a polyepoxide; and magnesium oxide.

Aspect 15. The primer system of Aspect 14, wherein, the first part comprises: from 18 wt % to 30 wt % of the thiol-terminated urethane-containing polyether prepolymer; and from 11 wt % to 23 wt % of the calcium carbonate; wherein wt % is based on the total weight of the first part; and the second part comprises: from 9 wt % to 17 wt % of the polyepoxide; and from 16 wt % to 28 wt % of the magnesium oxide, wherein wt % is based on the total weight of the second part.

Aspect 16. The primer system of Aspect 15, wherein the primer system, further comprises a third part, wherein the third part comprises a solvent.

Aspect 17. The primer system of Aspect 16, wherein the primer system comprises: from 30 wt % to 42 wt % of the first part; from 24 wt % to 30 wt % of the second part; and from 30 wt % to 42 wt % of the third part, wherein wt % is based on the total weight of the primer system.

Aspect 18. A composition comprising the primer system of Aspects 16-17, wherein the first part, the second part are combined, and the third part are combined.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A primer composition comprising:
    a thiol-terminated urethane-containing polyether prepolymer;
    a polyepoxide;
    from 5 wt % to 9 wt % calcium carbonate; and
    from 3 wt % to 7 wt % magnesium oxide,
    wherein wt % is based on the total weight of the primer composition.

2. The primer composition of claim 1, wherein the ratio (wt %/wt %) of calcium carbonate to magnesium oxide is greater than 1.3.

3. The primer composition of claim 1, wherein the primer composition comprises:
    from 16 wt % to 26 wt % of the calcium carbonate; and
    from 12 wt % to 20 wt % of the magnesium oxide,
    wherein wt % is based on the total solids weight of the composition.

4. The primer composition of claim 1, wherein the polyepoxide comprises a novolac epoxy resin.

5. The primer composition of claim 1, wherein,
    the calcium carbonate comprises nanoparticles characterized by a mean particle diameter from 20 nm to 200 nm; and
    the magnesium oxide comprises nanoparticles characterized by a mean particle diameter from 10 nm to 100 nm.

6. The primer composition of claim 1, wherein the primer composition comprises:
    from 8 wt % to 12 wt % of the thiol-terminated urethane-containing polyether prepolymer; and
    from 1 wt % to 5 wt % of the polyepoxide,
    wherein wt % is based on the total weight of the primer composition.

7. The primer composition of claim 1, wherein the primer composition comprises:
    from 20 wt % to 40 wt % of the thiol-terminated urethane-containing polyether prepolymer; and
    from 7 wt % to 13 wt % of the polyepoxide,
    wherein wt % is based on the total solids weight of the primer composition.

8. The primer composition of claim 1, wherein the primer composition comprises from 55 wt % to 65 wt % of a solvent or combination of solvents, wherein wt % is based on the total weight of the primer composition.

9. The primer composition of claim 1, wherein the primer composition comprises from 28 wt % to 40 wt % solids, wherein wt % is based on the total weight of the primer composition.

10. A cured primer coating prepared from the primer composition of claim 1.

11. A substrate comprising the cured primer coating of claim 10.

12. The substrate of claim 11, wherein the substrate comprises aluminum or an aluminum alloy.

13. A multilayer coating, comprising,
    a cured primer coating prepared from the primer composition of claim 1; and
    a cured polyurethane coating overlying the cured primer coating.

14. A method of coating a surface, comprising:
    applying the primer composition of claim 1 to a surface;
    curing the primer composition to provide a cured primer coating;
    applying a polyurethane coating over at least a portion of the cured primer coating; and
    curing the polyurethane coating to provide a coated surface.

15. The method of claim 14, wherein the surface comprises a surface of an aerospace vehicle.

16. A primer system, comprising:
    a first part comprising:
        a thiol-terminated urethane-containing polyether prepolymer; and
        calcium carbonate; and
    a second part comprising:
        a polyepoxide; and
        magnesium oxide.

17. The primer system of claim 16, wherein,
    the first part comprises:
        from 18 wt % to 30 wt % of the thiol-terminated urethane-containing polyether prepolymer; and
        from 11 wt % to 23 wt % of the calcium carbonate;
        wherein wt % is based on the total weight of the first part; and
    the second part comprises:
        from 9 wt % to 17 wt % of the polyepoxide; and
        from 16 wt % to 28 wt % of the magnesium oxide,
        wherein wt % is based on the total weight of the second part.

18. The primer system of claim 16, wherein the primer system, further comprises a third part, wherein the third part comprises a solvent.

19. The primer system of claim 18, wherein the primer system comprises:
    from 30 wt % to 42 wt % of the first part;
    from 24 wt % to 30 wt % of the second part; and
    from 30 wt % to 42 wt % of the third part,
    wherein wt % is based on the total weight of the primer system.

20. A composition comprising the primer system of claim 18, wherein the first part, the second part, and the third part are combined.

21. A primer composition comprising:
    from 20 wt % to 40 wt % of a thiol-terminated urethane-containing polyether prepolymer;
    from 7 wt % to 13 wt % of a polyepoxide;
    from 16 wt % to 26 wt % calcium carbonate;
    from 12 wt % to 20 wt % magnesium oxide; and
    a solvent or combination of solvents;

wherein wt % is based on the total solids weight of the primer composition.

22. An aerospace vehicle comprising the cured primer coating of claim 10.

* * * * *